Aug. 19, 1969          G. G. KANENGIETER          3,461,669
               CONTROL FOR HYDRAULIC DRIVE MECHANISM
Filed Dec. 28, 1967                              2 Sheets-Sheet 1
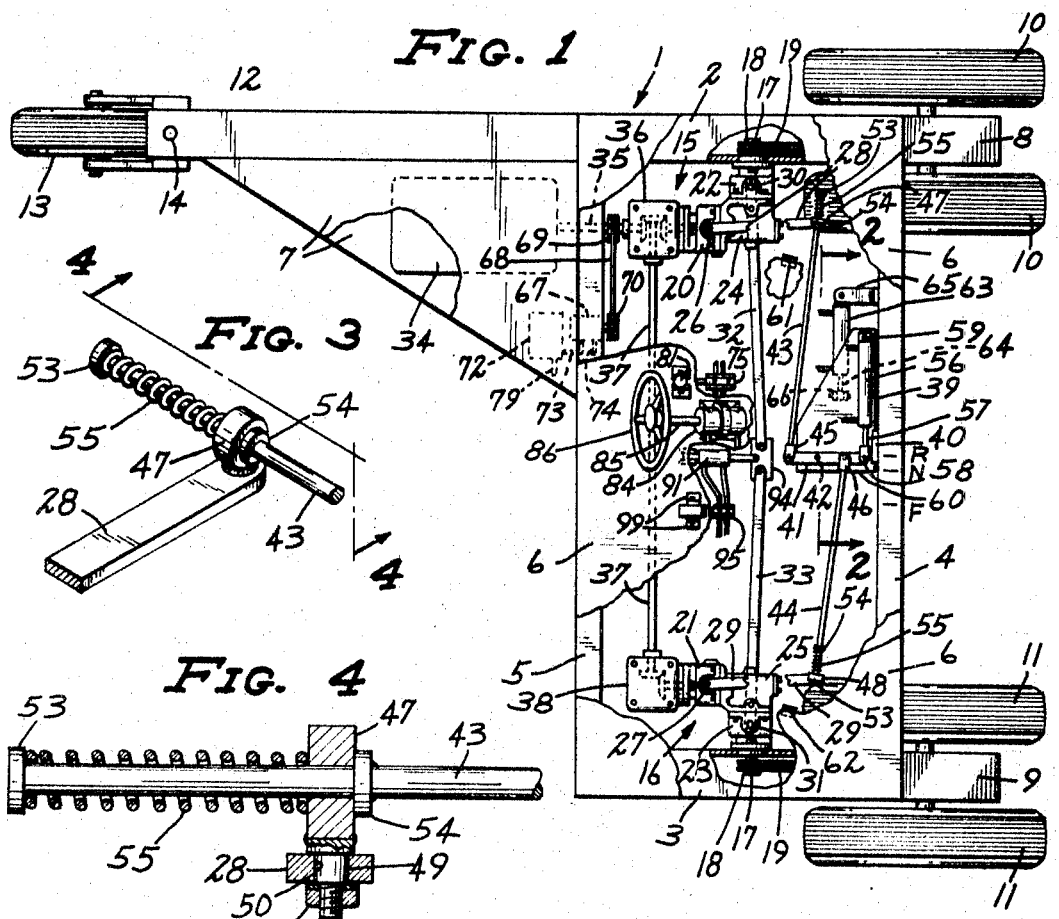
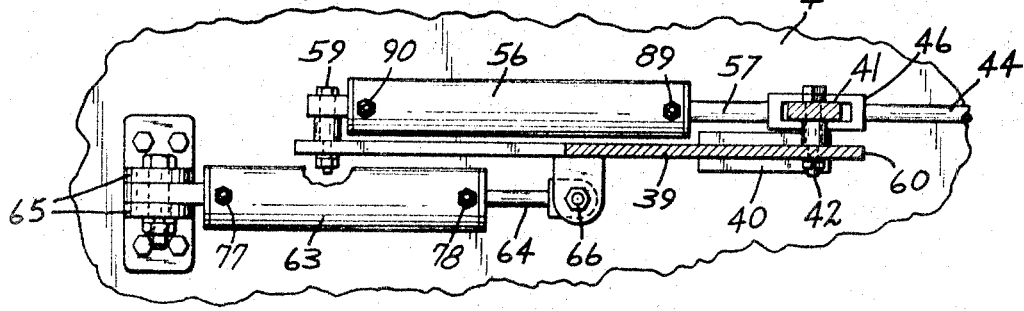
INVENTOR.
GLENN G. KANENGIETER
BY
Merchant & Gould
ATTORNEYS

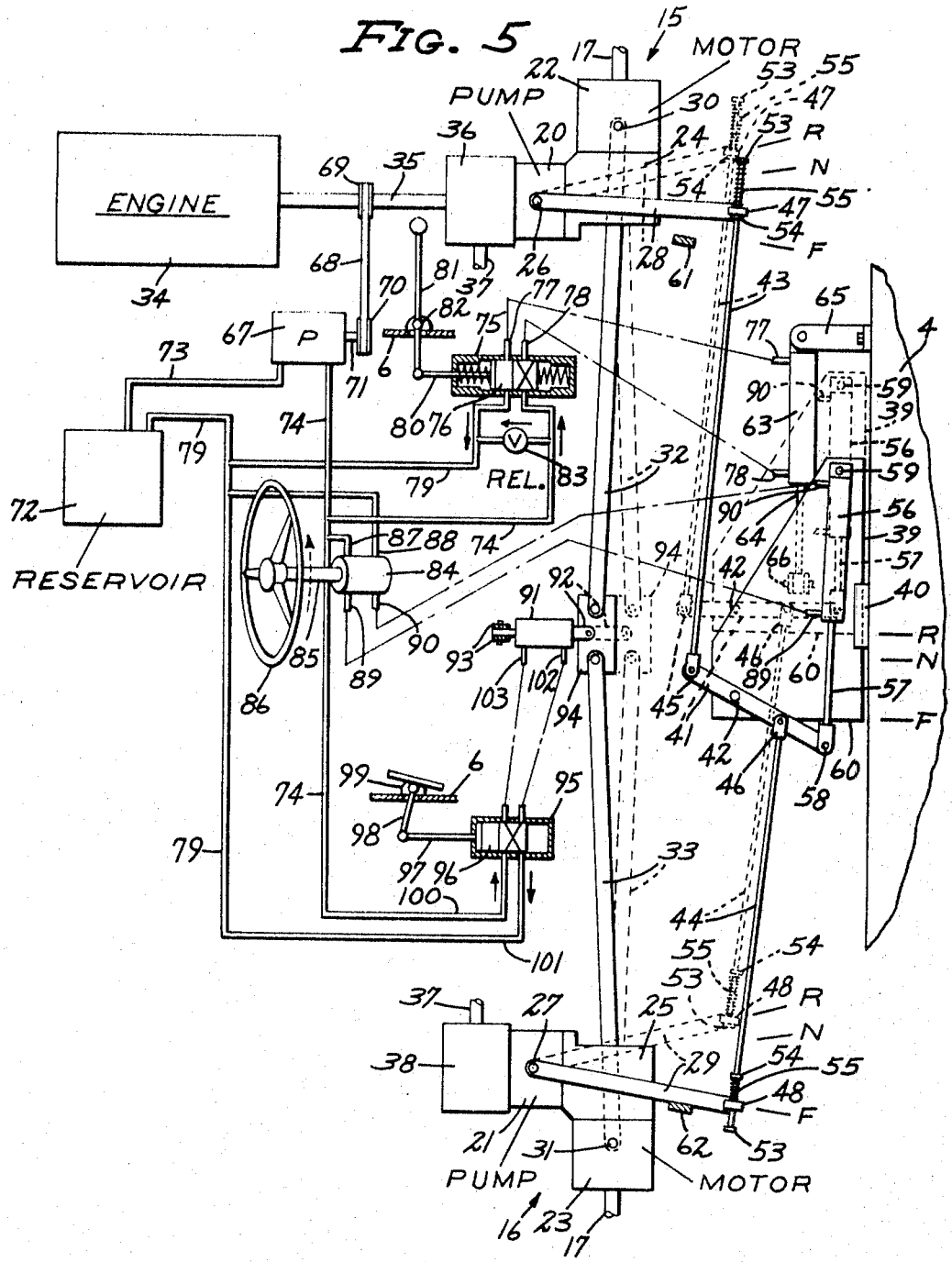

United States Patent Office 3,461,669
Patented Aug. 19, 1969

3,461,669
CONTROL FOR HYDRAULIC DRIVE MECHANISM
Glenn G. Kanengieter, Owatonna, Minn., assignor to Owatonna Manufacturing Company, Inc., Owatonna, Minn., a corporation of Minnesota
Filed Dec. 28, 1967, Ser. No. 694,347
Int. Cl. F16h *39/06, 39/48;* B60k *21/12*
U.S. Cl. 60—53                                                12 Claims

ABSTRACT OF THE DISCLOSURE

Apparatus for controlling operation of a pair of independent hydraulic drive motors for a vehicle, each motor being supplied with fluid under pressure from an individual variable displacement pump, each pump having a control arm for varying the pump displacement. A movable base member carries a lever operatively connected to the control arms. Controlled power-operated means moves the base member to shift the control arms simultaneously, and other controlled power operated means moves the lever relative to the base member to shift the control arms in directions to effect steering of the vehicle by a differential in displacement between the pumps. Speed range determining means is operative to vary hydraulic motor displacement to obtain relatively high and low ranges of travel speed of the vehicle.

Background of the invention

Steering control of vehicles, by control of independent drive means at opposite sides of the vehicle, is well known in such vehicles as those using endless belts or treads as the ground-engaging and driving means, and others of the type disclosed in U.S. Letters Patent 3,151,429, to Gorden Dyrdahl. Some vehicles of these types are driven by hydraulic motors supplied with fluid under pressure by one or more pumps, and controlled by valves governing the flow of fluid to the motors. In many of these, the pump or pumps are remote from the hydraulic motors and require relatively long fluid lines and complex valve arrangements for adequate control of the motors.

Summary of the invention

An important object of the invention is the provision of a control for hydraulic vehicle drive mechanism using a pair of independent hydraulic motors and individual pumps therefor, wherein the control is highly simplified in construction, precise in its operation, which may be manipulated with a minimum of effort by the operator, and which provides an effective safety factor in operation of the vehicle. To these ends, I provide a base member movable selectively in opposite directions relative to the vehicle frame structure, a lever pivotally mounted on the base member, and a pair of spaced links connected to the lever and each to a displacement control arm on a different one of the pumps supplying fluid under pressure to respective hydraulic motors. Manually controlled fluid pressure operated means is utilized to move the pump displacement control arms through the base member, lever and links, to impart rotation to the hydraulic motors simultaneously in either forward or reverse directions, and to vary the speed of the motors simultaneously. I further provide power-operated means, controlled by a steering wheel and fluid metering device, for pivotally moving the lever relative to the base member whereby to vary the speed of one of the hydraulic motors relative to the other thereof to effect steering of the vehicle. Power-operated manually controlled speed range determining means involves a fluid pressure operated device for simultaneously varying the displacement of the hydraulic motors, whereby to provide a relatively high rotational speed of the motors for road travel and a relatively lower rotational speed for field travel.

Another feature of this invention resides in a lost motion or over-ride connection between the links and their respective displacement control arms, whereby the speed of either of the motors cannot exceed a predetermined maximum and, when operating at maximum speed, steering of the vehicle is accomplished only by reducing the speed of one of the hydraulic motors without increasing that of the other beyond said predetermined maximum.

Description of the drawings

FIG. 1 is a view partly in top and partly diagrammatic, of a vehicle, some parts being broken away and some parts being shown in section;

FIG. 2 is an enlarged fragmentary view partly in elevation and partly in section, taken substantially on the line 2—2 of FIG. 1;

FIG. 3 is an enlarged fragmentary view in perspective of a control arm and cooperating link of FIG. 1;

FIG. 4 is a further enlarged fragmentary section taken substantially on the line 4—4 of FIG. 3; and FIG. 5 is an enlarged diagrammatic view corresponding to a portion of FIG. 1.

Detailed description

For the purpose of the present example, the vehicle illustrated in FIG. 1 is similar to that disclosed in the above mentioned U.S. Patent 3,151,429, and involves frame structure indicated generally by the numeral 1, comprising laterally spaced side frame members 2 and 3, front and rear cross frame members 4 and 5 respectively, a deck 6, and gusset-like brace members 7. The front end portions of the side frame members 2 and 3 are formed to provide hollow leg portions 8 and 9 respectively and in which are journalled pairs of drive wheels 10 and 11 respectively. As shown, the side frame member 2 extends rearwardly of the rear cross frame member 5 and at its rear end 12 is provided with a caster wheel 13 pivotally connected thereto as indicated at 14.

The pairs of wheels 10 and 11 are independently driven by respective hydraulic units 15 and 16 that are mounted on the side frame members 2 and 3 respectively, and which have output shafts 17 on which are mounted sprocket wheels 18 which drive their respective pairs of wheels 10 and 11 through endless drive chains 19 and other cooperating sprocket wheels, not shown, but which may be assumed to be mounted on the shafts of the wheels 10 and 11 in the usual manner.

The hydraulic units 15 and 16 are identical except that one thereof is right-hand and the other left-hand for convenience in installation. The hydraulic units 15 and 16 comprise variable displacement pumps 20 and 21 respectively, variable displacement hydraulic motors 22 and 23 respectively, and fluid transfer housings 24 and 25 respectively. Both the hydraulic pumps and motors are of the type which utilize rotating cylinders and axially movable pistons that engage swash plates. For the purpose of the present example, the hydraulic units 15 and 16 are of the type manufactured and sold by the Vickers, Inc., Division of Sperry Rand Corporation of Detroit, Mich., under their model TY1515, and are well-known in the industry. Hence, and in view of the fact that the units 15 and 16 in and of themselves do not comprise the instant invention, detailed showing and description thereof is omitted in the interest of brevity. It should suffice to state that displacement of the pumps 20 and 21 is varied by angular displacement of the swash plates thereof, not shown, between zero and the maximum displacement. Further, the swash plates may be angularly displaced to a point wherein the pump displacement may be varied between zero and maximum displacement in a reverse direction, whereby to impart reverse direction to the motors 22 and 23. The swash plates of the pumps 20 and 21 may be assumed to be mounted on shafts 26 and 27 respectively and to which are secured the inner ends of a pair of respective displacement control arms 28 and 29. In like manner, the swash plates of the hydraulic motors 22 and 23 are adjusted by shafts 30 and 31 respectively, and pair of motor displacement control arms 32 and 33 are rigidly secured at their outer ends to respective ones of the displacement control shafts 30 and 31.

The hydraulic pumps 20 and 21 of the units 15 and 16 respectively are driven by a prime mover in the nature of an internal combustion engine 34, shown diagrammatically in the drawings and having an output shaft 35 that is operatively connected to the pump 20 through gearing contained within a gear box 36, as shown by dotted lines in FIG. 1. A transverse shaft 37 extends from the gear box 36 to a second gear box 38 having driving connections therein connected to the pump 21, as shown by dotted lines in FIG. 1. The gearing arrangement is conventional in nature, and is such as to drive the pumps 20 and 21 in like directions and at like speeds. As shown, the engine 34 is conveniently mounted betwen the brace members 7 adjacent the side frame member 2 of the frame 1.

Means for moving the displacement control arms 28 and 29 to vary the displacement of their respective pumps 20 and 21, and for reversing the direction of fluid flow from the pumps 20 and 21 to their respective motors 22 and 23, comprises a base member 39 that is carried by the frame 1 by suitable means including a guide member 40 mounted on the cross frame member 4, for linear movements transversely of the frame 1, and other parts now to be described. A lever 41 is pivotally mounted intermediate its ends to the base member 39, as indicated at 42, for swinging movement on an axis normal to the direction of movement of the base member 39. A pair of elongated rigid links 43 and 44 have inner bifurcated ends 45 and 46 respectively that are pivotally secured to the lever 41 at diametrically opposite points equally spaced from the axis of the pivotal mounting 42. The outer end portions of the links 43 and 44 are axially slidably mounted in coupling elements 47 and 48 respectively, each of the coupling elements 47 and 48 being pivotally mounted on the outer ends of respective displacement control arms 28 and 29, the former being shown in detail in FIGS. 3 and 4. As shown in FIG. 4, the coupling element 47 is provided with a shaft 49 journaled in an opening 50 in the outer end of the displacement control arm 28 and held thereon by a washer-equipped nut 51 screw-threaded on a reduced threaded shank 52 of the shaft 49. The coupling element 48 is mounted on the outer end of the displacement control arm 29 in the same manner. Each of the links 43 and 44 has rigidly mounted thereon a pair of longitudinally spaced stop collars 53 and 54, and a coil compression spring 55. The collars 53 and 54 define annular shoulders for their respective links 43 and 44, the spring 55 associated with the link 43 being interposed between the collar 53 thereof and the coupling element 47, to yieldingly urge the control arm 28 and link 43 toward engagement of the coupling element 47 with the collar 54. The spring 55, associated with the link 44, is interposed between the coupling element 48 and the collar 54 of the link 44, and yieldingly urges the link 44 and arm 29 toward engagement of the coupling element 48 toward engagement with the stop collar 53 of the link 44. The coupling elements 47 and 48, and their respective shoulder defining stop collars 53 and 54 provide lost motion connections between the links 43 and 44 and their respective control arms 28 and 29, for a purpose which will hereinafter be described. The lever 41 is pivotally moved relative to the base member 39, and is also selectively held against such pivotal movement by fluid pressure operated means in the nature of a hydraulic cylinder 56 and a cooperating piston plunger 57 pivotally connected to the lever 41, as indicated at 58. The cylinder 56 is pivotally connected to the base member 39 by means including a pivot bolt or the like 59, see particularly FIG. 2. The base member 41 is movable transversely of the frame 1 between a neutral position of the pumps 20 and 21, as shown by full lines in FIG. 1, and full forward and reverse positions by full and dotted line position respectively, as shown in FIG. 5. These positions are indicated by registration of a transverse edge 60 of the base member 39 with a neutral line N, a full forward line F and a reverse line R in FIGS. 1 and 5. The corresponding positions of the displacement control arms 28 and 29 are indicated by similarly labeled lines in FIG. 5, adjacent the displacement control arms. It will be noted, with reference to FIG. 5, that the pumps 20 and 21 are so disposed that their respective displacement control arms 28 and 29 move in the same directions from their neutral positions toward their fully forward positions, and in the same opposite direction toward their reverse position. Movement of the displacement control arms 28 and 29 in a forward direction is limited by a pair of respective stop elements 61 and 62 secured to the deck 6 in the path of travel of their respective displacement control arms.

Movement is imparted to the base member 39 to vary the displacement of the pumps 20 and 21 by a fluid pressure cylinder 63 and a cooperating piston-equipment plunger rod 64, the former of which is pivotally mounted to a bracket 65 rigidly mounted on the cross frame member 1, the plunger rod 64 being pivotally connected to the base member 39, as indicated at 66, see particularly FIG. 2. Fluid under pressure is delivered to the cylinder 63 from a pump 67 that is driven from the engine shaft 35 by an endless belt 68 entrained over a pulley 69 on the drive shaft 35 and a second pulley 70 on the shaft 71 of the pump 67. The pump 67 receives fluid from a reservoir 72 through a conduit 73 and delivers fluid under pressure toward the cylinder 63 through a conduit 74.

Means for controlling operation of the cylinder 63 comprises a conventional reversing valve 75 including an axially movable valve element 76, the valve 75 being connected to the cylinder 63 by a pair of conduits 77 and 78, the pressure conduit 74, and a return conduit 79 to the reservoir 72. As shown in FIG. 5, the valve element 76 is spring biased toward a neutral position wherein no fluid is permitted to pass therethrough. This arrangement provides for a hydraulic lock for the cylinder 63 so that the base member 39 and all parts carried or moved thereby are locked in any desired set position of movement of the base member 39. A valve actuator rod 80, connected to the valve element 68, extends axially outwardly from one end of the valve 75 and is connected at its opposite end to one end of a valve actuating lever 81 pivotally connected to the deck 6, as indicated at 82. Movement of the lever 81 in either direction from a neutral position shown in FIG. 5 will position the valve element 76 to permit flow of pressure fluid from the pump 67 to the cylinder 63 through a selected one of the conduits 77 and 78, fluid returning to the reservoir from the opposite end of the cylinder 63 through the other one of the conduits 77 and 78 and the return conduit 79. A pressure relief valve 83, connected across the conduits 74 and 79 adjacent the valve 75, opens to permit flow of fluid from the pump 67 to the reservoir 72 when the valve element 76 is in its neutral position shown in FIG. 5. The valve 75 and its cooperating valve element 76 are of well-known conventional construction, and hence are shown more or less diagrammatically in FIG. 5. It will be noted that operation of the lever 81 causes the control arms 28 and 29 to be shifted together, to effect simultaneous increase or decrease in speed or direction of rotation of the hydraulic motor shafts 17 so that, with the lever 41 in a given position of pivotal movement on the base member 39, the shafts 17 will rotate at the same speed.

The fluid cylinder 56 and plunger rod 57 cooperate with the pump 67 to provide a second power-operated means for imparting pivotal movements to the lever 41 independently of movement of the base member 39, to vary the displacement of one of the pumps 20 and 21 relative to the other thereof, to effect a differential in speeds or direction of rotation between the motor shafts 17, whereby to provide steering of the vehicle during forward or reverse travel. Control means for the cylinder 56 and plunger 57 comprises a metering or power steering device 84 having a rotary shaft 85 to which is connected a steering wheel or the like 86. The metering or power steering device 84 may be any one of a number of commercially available devices of the type disclosed in the United States Reissue Patent 25,126, issued Feb. 20, 1962, to Lynn L. Charlson. This device has an inlet 87 connected to the pressure conduit 74 and an outlet 88 connected to the return conduit 79, and a pair of fluid delivery conduits 89 and 90 each connected to an opposite end of the cylinder 56. Rotation imparted to the wheel 86 in one direction will enable the pump 67 to deliver fluid to one end of the cylinder 56, such as through the conduit 90, to increase the displacement of the pump 21 and simultaneously decrease the displacement of the pump 20, to cause steering of the vehicle in one direction. Conversely, rotating the wheel 86 in the opposite direction will cause delivery of fluid to the opposite end of the cylinder 56, through the conduit 90, whereby the shift the lever 41 in a direction of its pivotal movement to cause a decrease in the displacement of the pump 21 and an increase in that of the pump 20, to effect steering of the vehicle in the opposite direction. When operating the vehicle at relatively low forward or reverse speeds, sufficient turning of the steering wheel 86 will cause one of the motor shafts 17 to become stationary or even rotate in the opposite direction from that of the other shaft 17 to provide for turning of the vehicle on a very short radius or even about an axis intermediate the pairs of wheels 10 and 11.

For the purpose of enabling the vehicle to travel at road speeds greater than those required for or permitted by field conditions, I provide speed range determining means for increasing or decreasing the displacement of the hydraulic motors 22 and 23, comprising a fluid pressure operated cylinder 91 and a cooperating piston-equipped plunger 92 and a control therefor. One end of the cylinder 91 is pivotally connected to the deck 6 by means of a bracket 93, the plunger rod 92 being pivotally connected to the ends of the hydraulic motor displacement control arms 32 and 33 by a connector plate or the like 94. As shown in FIG. 5, the cylinder 91 is operative to move the control arms 32 and 33 between relatively high motor displacement positions shown by full lines in FIG. 5, and relatively low motor displacement positions shown by dotted lines in FIG. 5. As there shown, the cylinder 91 is operatively connected to the pump 67, and is controlled by a valve 95 having an axially movable valve element 96 that is connected to one end of an actuator rod 97, the opposite end of which is connected to a pedal-equipped lever 98 pivotally mounted in a bracket 99 on the deck 6. The valve 95 is provided with an inlet conduit 100 that is connected to the pressure conduit 74, and an outlet conduit 101 that is connected to the return conduit 79 to the reservoir 72. Other conduits 102 and 103 connect opposite ends of the cylinder 91 to the valve 95, the lever 98 being operable to move the valve element 96 to positions to introduce pressure fluid selectively to opposite ends of the cylinder 91.

In actual practice, the fluid transfer housings 24 and 25 contain auxiliary pumps either one of which may be substituted for the pump 67 and reservoir 72 for supplying fluid under pressure to the various cylinders 56, 63 and 91 through their respective control devices 84, 75 and 95. However, for the sake of illustration, the pump 67 and reservoir 72 with the pump operating elements 68–70 are utilized, in the interest of clarity.

The lost motion connections 47–55 between the links 43 and 44 and their respective displacement control arms 28 and 29 provide a safety feature in the steering of a vehicle when operating at full forward speeds in both the high and low speed ranges. When operating at less than full forward speed, turning of the steering wheel 86 in either direction from a neutral position causes the speed of one of the hydraulic motor shafts 17 to be increased and the other thereof to be decreased. However, when operating at full speed in a forward direction, both displacement control arms 28 and 29 abut their respective stop elements 61 and 62. Then, when the steering wheel 86 is rotated in a direction to introduce pressure fluid to the cylinder 56 through the conduit 90, the lever 41 is pivotally moved form its neutral position, shown by dotted lines in FIG. 5 to its full line position thereof relative to the base member 39. The link 44 is moved longitudinally beyond its normal full forward speed position, compressing the spring 55, the stop element 62 preventing further movement of the control arm 29. At the same time, the link 43 moves in a direction to swing its respective control arm 28 in a speed decreasing direction away from its respective stop element 61. Thus, a relatively sharp turn cannot be made with the vehicle traveling at its full forward speed in either of the speed ranges above described, and tendency of the vehicle to tip over during a turn is substantially reduced. As will be noted by the relative spacing between the lines R, N, and F, the control arms 28 and 29 are so disposed relative to their respective swash plates, not shown, that the range of forward speed from a neutral position is substantially greater than that of reverse speed. This is done by reason of the fact that reverse operation of the vehicle is usually required to a much less extent than forward operation thereof.

The above-described control has been thoroughly tested and found to be highly effective in obtaining smooth and efficient operation of a hydraulically driven vehicle of the type set forth; and, while I have shown and described a commercial embodiment of control, it will be understood that the same is capable of modification, and that modification may be made without departure from the spirit and scope of the invention, as defined in the claims.

What is claimed is:

1. A control for a hydraulic drive mechanism for a vehicle including a frame and a pair of rotary members at opposite sides of the frame, said drive mechanism including a pair of hydraulic drive motors each connected to different one of said rotary members, a pair of variable displacement pumps each hydraulically coupled to a different one of said motors and each having a pivotally mounted displacement control arm thereon movable in directions to control operation of its respective pump to impart infinitely variable speed to its respective motor selectively in forward and reverse directions of rotation, and means for driving said pumps, said control comprising:

(a) a base member movable in opposite linear directions relative to said frame;

(b) a lever pivotally mounted on said base member on an axis normal to the direction of movement of said base member;

(c) a pair of links each having an inner end connected to said lever radially spaced from said axis and each having an outer end portion for disposition adjacent a different one of said control arms;

(d) means for operatively connecting said link outer end portions to the adjacent control arms;

(e) power operated means for imparting movements to said base member selectively in said directions of movement thereof, whereby to move said control arms simultaneously in directions to effect common change in direction and speed selectively of said motors;

(f) control means for said power operated means;

(g) second power operated means carried by said base member for imparting pivotal movement to said lever in directions to vary the operation of said pumps to selectively change the direction and speed of said motors relative to each other, independently of said first mentioned power operated means, to effect steering of the vehicle; and (h) control means including a manually operated steering member for said second power operated means.

2. The control defined in claim 1, in which said lever is pivotally connected intermediate its end to said base member, said links having their inner ends pivotally connected to said lever at diametrically opposite points spaced from the pivotal mounting axis of said lever.

3. The control defined in claim 1, in which said first mentioned power operated means comprises a fluid pressure cylinder having means for connection to a source of fluid under pressure and a cooperating piston equipped plunger rod, one of said cylinder and rod being secured to said base member and the other having means for attachment to said vehicle frame.

4. The control defined in claim 3, in which said first mentioned control means includes a valve operatively connected to said cylinder, and an operating lever for said valve, said valve being ported to introduce fluid under pressure selectively to opposite ends of said cylinder.

5. The control defined in claim 1, in which said second power operated means includes a second fluid pressure operated cylinder and a cooperating piston equipped plunger rod, one of said cylinder and rod being mounted on said base member and the other being connected to said lever, said second cylinder having means for connection to said source of fluid.

6. The control defined in claim 5, in which said last mentioned control means includes a reversible fluid metering device operatively connected to said steering member, said metering device being interposed in said means for connection of said second cylinder to said source of fluid.

7. The control defined in claim 1, in which said hydraulic motors are variable displacement motors, characterized by a second pair of displacement control arms each connected to a different one of said motors, and speed range determining means for shifting said second pair of control arms simultaneously to vary the displacement of said motors to effect relatively high or low speed range of operation of said motors simultaneously.

8. The control defined in claim 7, in which said speed range determining means comprises a fluid pressure cylinder connected to said fluid source, and a cooperating piston equipped plunger, one operatively connected to said second pair of control arms and the other being adapted for connection to the vehicle frame, and a manually operated control valve for said last mentioned cylinder.

9. The control defined in claim 1, characterized by a pair of stop elements each disposed in the path of movement of a different one of said displacement control arms to limit movement of said arms in a pump displacement increasing direction, said means for operatively connecting said link outer end portion to said displacement control arms comprising a limited lost-motion connection between each link and its respective control arm, and yielding means biasing each cooperating link and control arm toward one limit of lost-motion therebetween, whereby to permit continued movement of said links in pump displacement increasing directions upon engagement of said arms with their respective stop elements.

10. The control defined in claim 1, characterized by a pair of stop elements each disposed in the path of movement of a different one of said displacement control arms to limit movement of said arms in a pump displacement increasing direction, said means for operatively connecting said link outer end portions to said control arms comprising a pair of coupling portions each on a different one of said arms, said coupling portions each having an opening for longitudinally slideable reception of an adjacent one of said links, means defining a pair of shoulders on each of said arms at opposite sides of their respective coupling portions, and a pair of yielding members biasing said control arms in directions to effect engagement of each of said coupling portions with a given one of its respective shoulders.

11. A control for a hydraulic drive mechanism for a vehicle including a frame and a pair of rotary members at opposite sides of the frame, said drive mechanism including a pair of hydraulic drive motors each connected to a different one of said rotary members, a pair of variable displacement pumps each hydraulically coupled to a different one of said motors and each having a pivotally mounted displacement control arm thereon movable in directions to control operation of its respective pump to impart infinitely variable speed to its respective motor selectively in forward and reverse directions of rotation, and means for driving said pump, said control comprising:

(a) a base member movable in opposite linear directions relative to said frame;

(b) a lever pivotally mounted on said base member on an axis normal to the direction of movement of said base member;

(c) a pair of links each having an inner end connected to said lever radially spaced from said axis and each having an outer end portion for disposition adjacent a different one of said control arms;

(d) means for operatively connecting said link outer end portions to the adjacent control arms;

(e) means for imparting movements to said base member selectively in said directions of movement thereof, whereby to move said control arms simultaneously in directions to effect common change in direction and speed selectively of said motors;

(f) power operated means carried by said base member for imparting pivotal movement to said lever in directions to vary the operation of said pumps to selectively change the direction and speed of said motors relative to each other to effect steering of the vehicle; and (g) control means including a manually operated steering member for said power operated means.

12. The control defined in claim 11, in which said means for imparting movements to the base member includes an actuating lever and a base member moving element connected to said base member and vehicle frame and operatively connected to said actuating lever.

References Cited

UNITED STATES PATENTS

| | | | |
|---|---|---|---|
| 2,774,434 | 12/1956 | Ferris | 180—6.3 |
| 3,024,858 | 3/1962 | Davis et al. | 180—66 XR |
| 3,114,424 | 12/1963 | Voreaux et al. | 180—6.3 |
| 3,209,538 | 10/1965 | Kuze | 60—53 |
| 3,279,172 | 10/1966 | Kudo et al. | 60—53 |

EDGAR W. GEOGHEGAN, Primary Examiner

U.S. Cl. X.R.

180—6.3, 66